(12) United States Patent
Brosche et al.

(10) Patent No.: US 12,044,807 B2
(45) Date of Patent: Jul. 23, 2024

(54) SENSOR DEVICE

(71) Applicant: Robert Bosch GmbH, Stuttgart (DE)

(72) Inventors: Thomas Brosche, Leonberg (DE);
Oliver Kern, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 977 days.

(21) Appl. No.: 16/962,326

(22) PCT Filed: Jan. 15, 2019

(86) PCT No.: PCT/EP2019/050855
§ 371 (c)(1),
(2) Date: Jul. 15, 2020

(87) PCT Pub. No.: WO2019/141642
PCT Pub. Date: Jul. 25, 2019

(65) Prior Publication Data
US 2020/0341127 A1 Oct. 29, 2020

(30) Foreign Application Priority Data
Jan. 16, 2018 (DE) .......................... 102018200618.0

(51) Int. Cl.
*G01S 7/4915* (2020.01)
*G01S 7/481* (2006.01)
(Continued)

(52) U.S. Cl.
CPC .......... *G01S 7/4915* (2013.01); *G01S 7/4817* (2013.01); *G01S 7/4917* (2013.01); *G01S 17/003* (2013.01)

(58) Field of Classification Search
None
See application file for complete search history.

(56) References Cited

U.S. PATENT DOCUMENTS

| 4,846,571 A | 7/1989 | Jelalian et al. |
| 5,589,928 A * | 12/1996 | Babbitt .................. G01S 17/42 356/4.09 |

(Continued)

FOREIGN PATENT DOCUMENTS

| CN | 101273280 A | 9/2008 |
| DE | 60304692 T2 | 4/2007 |

(Continued)

OTHER PUBLICATIONS

International Search Report for PCT/EP2019/050855, Issued Apr. 23, 2019.

(Continued)

*Primary Examiner* — Eric L Bolda
(74) *Attorney, Agent, or Firm* — NORTON ROSE FULBRIGHT US LLP; Gerard A. Messina

(57) ABSTRACT

A sensor device for determining a distance and/or speed of an object, including a transmitting unit for emitting light of at least one frequency onto the object, the transmitting unit being designed for emitting light in at least one angular range, the light in the angular range being time-dependent varied essentially simultaneously with frequencies in different frequency ranges, a receiving unit for receiving light reflected by the object, the receiving unit being designed for scanning the received light in the particular frequency range at least two points in time, and an evaluation unit, which is designed for determining the distance and/or the speed of the object on the basis of the emitted light and the points in time at which the received light was scanned.

13 Claims, 4 Drawing Sheets

(51) Int. Cl.
*G01S 7/4912* (2020.01)
*G01S 17/00* (2020.01)

(56) References Cited

U.S. PATENT DOCUMENTS

| | | | |
|---|---|---|---|
| 11,619,721 B2* | 4/2023 | Huang | G01S 7/4817 356/5.1 |
| 2006/0203224 A1* | 9/2006 | Sebastian | G01S 17/06 356/4.09 |
| 2010/0271615 A1* | 10/2010 | Sebastian | G01S 17/86 356/28 |
| 2015/0346340 A1 | 12/2015 | Yaacobi et al. | |
| 2016/0377721 A1* | 12/2016 | Lardin | G01S 17/58 356/5.09 |
| 2017/0307648 A1* | 10/2017 | Kotake | G01S 17/95 |
| 2017/0350964 A1* | 12/2017 | Kaneda | G01S 7/4865 |
| 2019/0011558 A1* | 1/2019 | Crouch | G08G 1/16 |
| 2019/0064358 A1* | 2/2019 | Desai | G01S 7/4911 |
| 2019/0257927 A1* | 8/2019 | Yao | G01S 7/4815 |
| 2020/0278432 A1* | 9/2020 | Thorpe | G01S 7/4915 |
| 2021/0096228 A1* | 4/2021 | Behzadi | G01S 7/4913 |

FOREIGN PATENT DOCUMENTS

| | | |
|---|---|---|
| EP | 1986021 A2 | 10/2008 |
| JE | 2012502301 A | 1/2012 |
| JP | H1082858 A | 3/1998 |
| JP | 2017142214 A | 8/2017 |

OTHER PUBLICATIONS

Wang Feiyu et al., "Prior Knowledge Aided Super-Resolution Line Spectral Estimation: An Iterative Reweighted Algorithm," 2017 IEEE International Conference on Acoustics, Speech and Signal Processing (ICASSP), IEEE, 2017, pp. 3296-3300. XP033259022.
Fang Jun et al., "Super-Resolution Compressed Sensing for Line Spectral Estimation: An Iterative Reweighted Approach," IEEE Transactions on Signal Processing, IEEE Service Center, vol. 64, No. 18, 2016, pp. 4649-4662. XP011617930.
Mishra, et al.: "Super-resolution Line Spectrum Estimation with Block Priors", ResearchGate, Apr. 2014, pp. 1-7.
Fang, et al.: "Super-Resolution Compressed Sensing: An Iterative Reweighted Algorithm for Joint Parameter Learning and Sparse Signal Recovery", (2014), pp. 1-5; obtained from https://arxiv.org/abs/1401.4312v1 on Jul. 23, 2020.

* cited by examiner

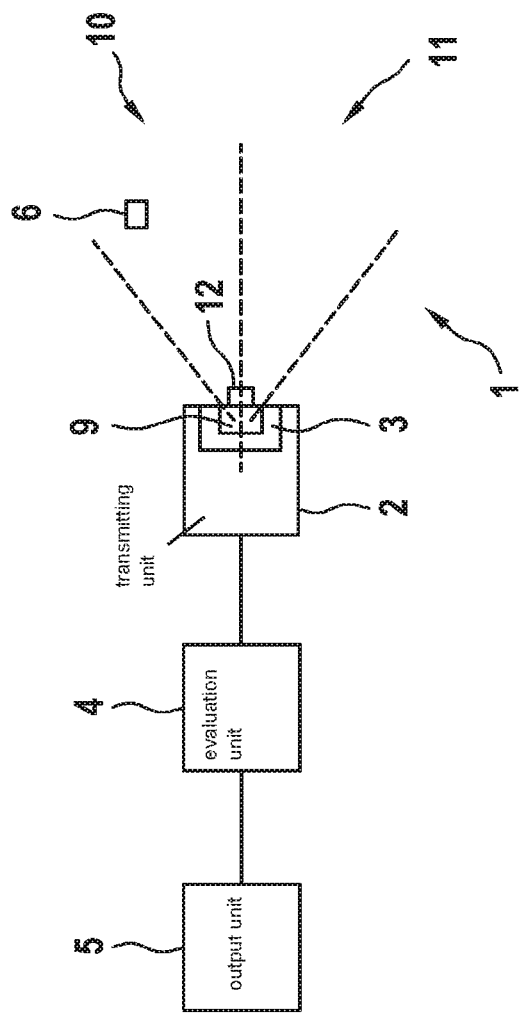

SENSOR DEVICE

FIELD

The present invention relates to a sensor device for determining a distance and/or speed of an object.

Moreover, the present invention relates to a method for determining a distance and/or speed of an object.

Although the present invention is usable on arbitrary transmitting units and receiving units, the present invention is described herein in conjunction with light detection and ranging—LIDAR—systems.

BACKGROUND INFORMATION

Conventional LIDAR systems utilize narrow-band laser beams, which are deflected in a certain direction. If the laser beam strikes an object, the distance of the object may be determined on the basis of the reflection of the laser beam at the object at this angle. For this purpose, for example, a linear frequency ramp, based on the FMCW—frequency modulated continuous wave radar—principle, is emitted and, with the aid of a coherent reception, the difference frequency between the transmitted ramp and the received ramp is ascertained. On the basis of this difference frequency, the distance of the object may then be determined. In order to be able to detect an object in an area, an area may be two-dimensionally illuminated. A short measuring time is necessary for this purpose, which, however, usually reduces the range, i.e., the distance, in which an object may be detected. The cause thereof is that, in the case of an increasing distance, the signal-to-noise ratio for a certain distance is linearly dependent on the measuring time and, in the case of an increasing measuring time, a detection and, therefore, a measurement is then no longer possible.

In the case of coherent LIDAR systems, the Doppler frequency is comparatively high due to the short wavelength of light. As a result, an unambiguous measurement of the Doppler frequency is difficult, since a very small temporal ramp spacing and, therefore, a very short ramp duration is necessary for this purpose.

SUMMARY

In one specific example embodiment, the present invention provides a sensor device for determining a distance and/or speed of an object, encompassing a transmitting unit for emitting light of at least one frequency onto the object, the transmitting unit being designed for emitting light in at least one angular range, the light in the at least one angular range being time-dependently varied essentially simultaneously with frequencies in different frequency ranges, a receiving unit for receiving light reflected by the object, the receiving unit being designed for scanning the received light in the particular frequency range at at least two points in time, and an evaluation unit, which is designed for determining the distance and/or the speed of the object on the basis of the emitted light and the points in time at which the received light was scanned.

In one further specific example embodiment, the present invention provides a method for determining a distance and/or speed of an object, including the steps emitting light in at least one angular range, with the aid of a transmitting unit, including at least one frequency onto the object, the light being time-dependently varied essentially simultaneously with frequencies in different frequency ranges, receiving light reflected by the object with the aid of a receiving unit, scanning the received light in the particular frequency range at least two points in time, determining the distance and/or speed of the object on the basis of the emitted light and the points in time at which the received light was scanned.

One of the advantages achieved therewith is that an unambiguous measurement of the (target) distance, i.e., of the spacing and the radial component of the (relative) speed of an object, is made possible within only one ramp duration. The ramp duration is, in particular, no longer limited by the uniqueness of the Doppler frequency. One further advantage is that ambiguities are prevented. The flexibility is also increased, since the distance may be measured regardless of the speed of the object.

Further features, advantages, and further specific embodiments of the present invention are described in the following or become apparent as a result:

According to one advantageous refinement of the present invention, the transmitting unit is designed for varying the frequency in the particular angular range in a temporally linear manner, preferably increasing from a starting frequency to an ending frequency. One of the advantages achieved therewith is that a simple temporal variation of the frequency is made possible across the entire frequency range. In addition, a subsequent evaluation is also simplified, since an unambiguous temporal assignment of the frequencies is made possible.

According to one further advantageous refinement, the transmitting unit includes a light source and a modulation unit for generating the time-dependent variation of frequencies of the light of the light source. With the aid of a modulation unit, a simple and simultaneously reliable modulation of the light of a light source, for example, of a laser, is possible.

According to one further advantageous refinement of the present invention, the modulation unit encompasses a modulator, in particular an acousto-optical modulator, for each of the different frequency ranges. This allows for a particularly reliable modulation.

According to one further advantageous refinement of the present invention, the modulation unit encompasses a modulator for the temporal variation of a frequency range and at least one further modulator for generating different frequency ranges. One of the advantages achieved therewith is that, due to the separation of frequency ranges and their particular temporal variation, a particularly reliable variation of frequencies may be provided in different frequency ranges. For example, a frequency offset between the various ranges may be generated with the aid of a phase modulator. In this process, the phase is temporally variably modulated and, as a result, a frequency offset is generated. Examples for such modulators are those which are based on the modulation of the charge carrier density or on the basis of electro-optical effects, such as the Pockels effect or the Kerr effect.

According to one further advantageous refinement of the present invention, the transmitting unit encompasses a scanning unit for emitting the light in different angular ranges. With the aid of a scanning unit, i.e., an additional scanning unit, certain angular ranges may be sequentially irradiated with light.

According to one further advantageous refinement of the present invention, the points in time at which scanning is carried out are selected having the same temporal distance. In this way, a simple temporal scanning may take place. In this way, for example, for the case in which a two-dimensional frequency estimation is carried out, at a completely equidistant scanning grating, the frequency estimation may also be divided into one-dimensional frequency estimations along each of the two dimensions.

According to one further advantageous refinement of the present invention, the determination of the distance and/or the speed of the object takes place on the basis of a two-dimensional Fourier transform and a frequency estimation. One of the advantages achieved therewith is that the distance and at least the radial component of the speed may therefore be determined for the object in a reliable way.

According to one further advantageous refinement of the present invention, the points in time at which scanning is carried out are selected having a non-equidistant temporal distance and/or the frequency spacings between at least two frequency ranges are selected to be different and the frequency estimation takes place with the aid of a compressed sensing method taking into consideration the distance-induced frequency component in a Doppler frequency.

In this way, the distance and/or speed of an object may also be reliably determined in the case of temporally non-equidistant scanning points and/or non-equidistant frequency spacings between simultaneously transmitted ramps. Compressed sensing methods are described, for example, in the document by Feiyu Wang, et al. "Prior knowledge aided super-resolution line spectral estimation: an iterative reweighted algorithm." Acoustics Speech and Signal Processing (ICASP), 2017 IEEE International Conference on. IEEE, 2017, and by Jun Fang, et al., "Super-Resolution Compressed Sensing for Line Spectral Estimation: An Iterative Reweighted Approach," IEEE Trans. on Signal Processing, Vol. 64, No. 18, Sep. 15, 2016, which are hereby incorporated by explicit reference. In addition to the compressed sensing methods, other methods suitable for the non-equidistant scanning are also applicable.

Further features and advantages of the present invention result from the figures herein, and from the associated description herein of the figures.

It is understood that the features, which are mentioned above and which will be described in greater detail in the following, are usable not only in the particular combination indicated, but also in other combinations or alone, without departing from the scope of the present invention.

Preferred embodiments and specific embodiments of the present invention are represented in the figures and are explained in greater detail below, identical reference numerals relating to identical or similar or functionally identical components or elements.

BRIEF DESCRIPTION OF THE DRAWINGS

FIG. 4 shows a sensor device according to one specific embodiment of the present invention.

DETAILED DESCRIPTION OF EXAMPLE EMBODIMENTS

Figure 1:
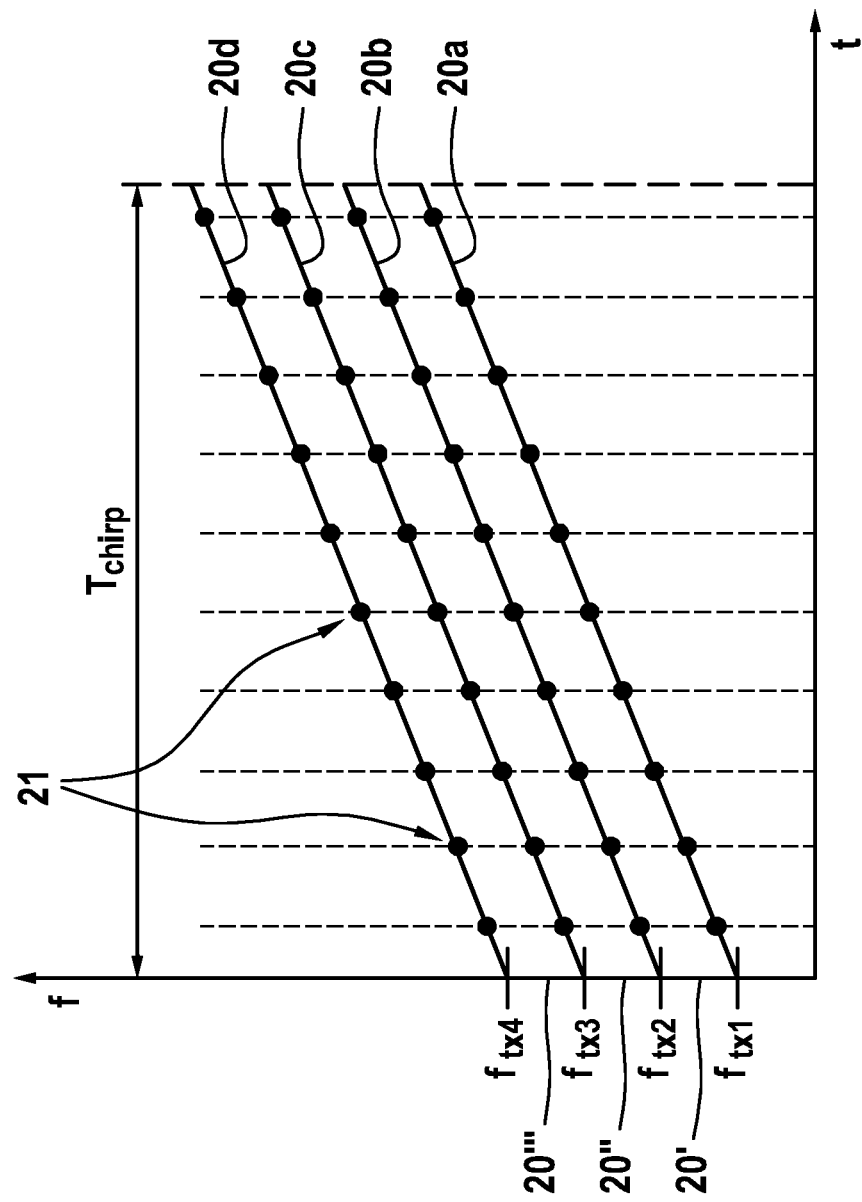
FIG. 1 shows a time-frequency representation of the temporal variation of frequencies according to a method according to one specific embodiment of the present invention.
Figure 2:
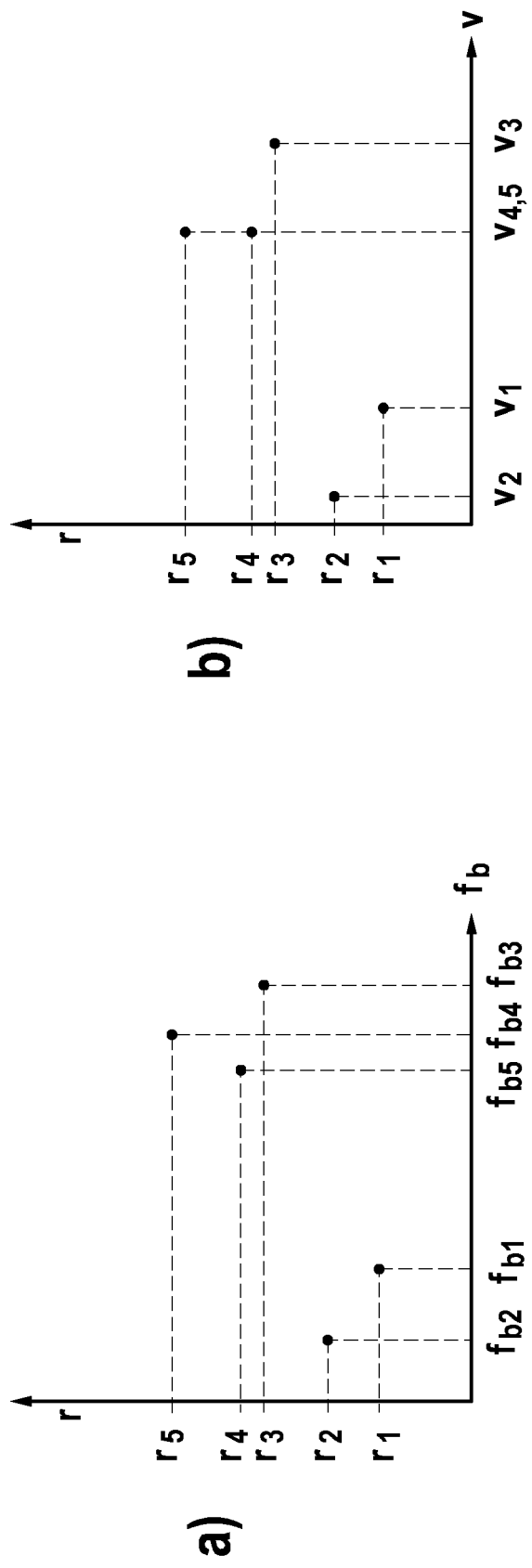
FIGS. 2a, 2b show a two-dimensional distance-beat frequency spectrum according to a method according to one specific embodiment of the present invention.

FIG. 1 shows a time-frequency representation of the temporal variation of frequencies according to a method according to one specific embodiment of the present invention, and FIGS. 2a, 2b show a two-dimensional distance-beat frequency spectrum according to a method according to one specific embodiment of the present invention.

In FIG. 1, a frequency division multiplexing, or FDM, modulation method including four simultaneously equidistantly shifted frequency ramps 20a, 20b, 20c, 20d is shown. In FIGS. 2a, 2b, a diagram for an exemplary distribution of the peaks is shown in a two-dimensional distance-beat frequency range spectrum.

In detail, FIG. 1 shows a time-frequency representation, frequency f being plotted over time t. Four frequency ramps 20a, 20b, 20c, 20d are apparent, each of which increases with the same slope in the same time interval Tchirp. Frequency ramps 20a, 20b, 20c, 20d differ with respect to their particular starting frequency by the identical frequency difference 20', 20'', 20''' in each case. Frequency differences 20', 20'', 20''' may be identical or different in this case. The starting frequency of first ramp 20a is the lowest in FIG. 1 and the starting frequency of fourth frequency ramp 20d is the highest. Due to the linear increase, the particular ending frequency of particular frequency ramp 20a, 20b, 20c, 20d is higher than starting frequency $f_{tx1}$, $f_{tx2}$, $f_{tx3}$, $f_{tx4}$, respectively. Of course, inverse frequency ramps are also possible, or a linearly decreasing frequency ramp. In FIG. 1, four frequency ramps 20a, 20b, 20c, 20d are apparent, although any other number of frequency ramps is also possible, for example, 1024.

The generation of frequency ramps 20a, 20b, 20c, 20d may take place in the following way: Light from a light source, for example, a laser, is generated with the aid of three different acousto-optical phase modulators 7a, 7b, 7c (see FIG. 3) and, in this way, in addition to non-modulated frequency ramp 20a, the three linear frequency ramps 20b, 20c, 20d are modulated. The four frequency ramps 20a, 20b, 20c, 20d differ with respect to their starting frequencies $f_{tx1}$, $f_{tx2}$, $f_{tx3}$, $f_{tx4}$, where $f_{tx2}=f_{tx1}+\Delta f$, $f_{tx3}=f_{tx2}+\Delta f$, etc. Offset frequencies 20', 20'', 20''' between the various starting frequencies $f_{tx1}$, $f_{tx2}$, $f_{tx3}$, $f_{tx4}$ do not necessarily need to be greater than the frequency deviation, i.e., the difference between the starting and ending frequencies of particular frequency ramp 20a, 20b, 20c, 20d. Frequency ramps $f_{tx1}$, $f_{tx2}$, $f_{tx3}$, $f_{tx4}$, once received, may be mixed into a particular baseband, also known as so-called "dechirping." The modulation is removed in the process and frequency ramps 20a, 20b, 20c, 20d are separated.

In the specific embodiments of the present invention described here, the aforementioned FDM modulation is utilized for the unambiguous determination of the distances. Maximum ramp distance 20', 20'', 20''' at a constant $\Delta f$ (equidistant) is dependent on the maximally unambiguously measurable distance $r_{max}$. In the case, for example, that $r_{max}=300$ m, a maximum ramp distance 20', 20'', 20''' of $\Delta f=500$ kHz results.

For this purpose, individual ramps 20a, 20b, 20c, 20d are demodulated, scanned, and subsequently transformed into the distance-beat frequency range with the aid of a two-dimensional Fourier transform. Alternatively, the demodulation may also take place in the digital range after the scanning. After the scanning and demodulation, a compensation of the component of the distance in the beat frequency, the detection of the peaks associated with the targets, and the estimation of the peak position (see FIG. 2b), i.e., of the target distance, i.e., of distance r and of the radial component of (relative) velocity v for each relevant target, take place. The latter steps correspond to a two-dimensional frequency estimation, which, at an equidistant scanning grating, may also be divided into two one-dimensional frequency estimations.

Alternatively, the distribution of the scanning points may also be non-equidistant. In this case, the two-dimensional Fourier transform and estimation of the peak position (frequency estimation) may be implemented, for example, with the aid of known compressed sensing methods.

Alternatively, the detection and estimation of the peak position may also be carried out in the distance-beat frequency spectrum (see FIG. 2a). The estimation of the speeds then takes place on the basis of the Doppler frequency after subtracting the distance-induced frequency component in the beat frequency.

Figure 3:
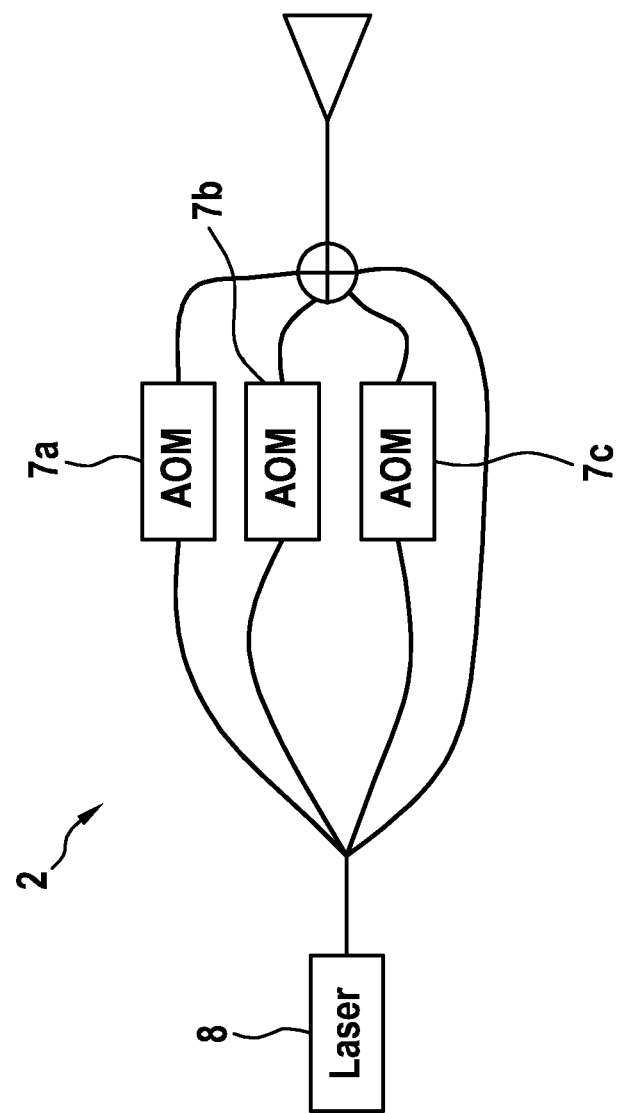
FIG. 3 shows one portion of a sensor device according to one specific embodiment of the present invention.

FIG. 3 shows one portion of a sensor device according to one specific embodiment of the present invention.

In detail, FIG. 3 shows one possible implementation of the frequency-shifted ramps with the aid of multiple acousto-optical modulators 7a, 7b, 7c. Further deviating implementation variants of the hardware, for example, a utilization of four AOMs in each transmission branch or another frequency modulation, are possible. One AOM 7a, 7b, 7c may be utilized for shifting a light signal in the frequency, i.e., color. A laser beam is frequency-modulated. According to already known methods, this may take place either directly, for example, by changing the laser current or, as represented here, externally by installing an optical phase modulator 7a, 7b, 7c downstream, so that an above-described linear frequency ramp arises. This modulated light signal is then divided into, for example, four paths. In this case, by way of example, one AOM 7a, 7b, 7c is introduced into three of the paths, each of the AOMs 7a, 7b, 7c generating the required frequency difference between ramps 20a, 20b, 20c, 20d. For the aforementioned example, one of the AOMs 7a, 7b, 7c would have to implement a shift by 500 kHz, a second a shift by 1 MHz and the third a shift by 1.5 MHz. The signals generated in this way are transmitted into the surroundings with the aid of the same output optics 12. The utilization of an additional scanning unit 9 in order to sequentially radiate into certain angular ranges 10, 11 is optionally possible.

FIG. 4 shows a sensor device according to one specific embodiment of the present invention.

In detail, a sensor device 1 is shown in FIG. 4. Sensor device 1 encompasses a transmitting unit 2, which is provided with a scanning unit 9 for irradiating various angular ranges 10, 11. Moreover, transmitting unit 2 encompasses emission optics 12. With the aid of transmitting unit 2, an object 6 would be irradiated in angular range 10. The light reflected by object 6 is received with the aid of a receiving unit 3 of the sensor device 1 and is routed to an evaluation unit 4 for ascertaining the distance and/or speed of object 6. With the aid of an output unit 5, the distance and/or the speed of object 6 may then be output, for example, forwarded to a control unit of a motor vehicle, or the like, for further processing.

In summary, the present invention, in particular at least one of the specific example embodiments, has at least one of the following advantages:

Unambiguous measurement of the distance of an object and the speed in an FMCW system within only one ramp duration
No limitation of the ramp duration
Utilization of various ramp slopes is possible
Utilization of various ramp frequency spacings is possible
Distance may be measured regardless of the speed
Longer ramp durations with lower scanning frequencies Although the present invention was described on the basis of preferred exemplary embodiments, it is not limited thereto. Instead, the present invention is modifiable in various ways.

In particular, the present invention may be utilized not only for LIDAR systems, but also for RADAR and solar systems, ultrasonic sensor systems, et cetera.

What is claimed is:

1. A sensor device for determining a distance and/or speed of an object, comprising:
   a transmitting unit configured to:
     generate light; and
     in a single frequency ramp period over time:
       produce from the light a plurality of light components that each has a respective frequency ramp with which respective frequencies of the respective light component change at a rate over the time of the ramp period from a respective starting frequency of the respective ramp at a start time of the ramp period to a respective ending frequency of the respective ramp at an end time of the ramp period, wherein:
         the rate is the same for different ones of the plurality of light components so that, for each pair of the plurality of light components, a respective offset between the frequencies of the respective pair is constant throughout the ramp period; and
         the respective starting frequencies of the plurality of light components all differ from one another so that respective frequency ranges of the plurality of light components all differ from one another; and
       simultaneously emit the plurality of light components onto the object in at least one angular range;
   a receiving unit configured to receive light reflected by the object, the receiving unit being configured to scan the received light in a particular frequency range at least two points in time; and
   an evaluation unit configured to determine the distance and/or the speed of the object based on the emitted light and the points in time at which the received light was scanned.

2. The sensor device as recited in claim 1, wherein the transmitting unit is configured to linearly vary the frequency in the angular range.

3. The sensor device as recited in claim 2, wherein the rate is constant so that the frequencies of each of the light components change linearly over the ramp period.

4. The sensor device as recited in claim 1, wherein the transmitting unit includes a light source and a modulation unit configured to vary the frequencies of the light components.

5. The sensor device as recited in claim 4, wherein the modulation unit includes a respective modulator for each of the light components, the modulation unit being an acousto-optical modulator.

6. The sensor device as recited in claim 1, wherein the at least one angular range includes a plurality of angular ranges, and the transmitting unit includes a scanning unit configured to emit the light components into different ones of the plurality of angular ranges.

7. The sensor device as recited in claim 1, wherein the respective frequency range of the respective ramp of one of the light components overlaps with the respective frequency range of the respective ramp of another of the light components.

8. The sensor device as recited in claim 1, wherein the transmitting unit includes:
- a plurality of modulators; and
- a single light source by which the light is generated, the generated light being supplied to the plurality of modulators for the production of the plurality of light components, with each of the plurality of modulators producing a respective one of the plurality of light components from the light generated by the single light source.

9. A method for determining a distance and/or speed of an object, comprising the following steps:
- in a single frequency ramp period:
  - using a transmitting unit to simultaneously emit, in at least one angular range and onto an object, a plurality of light components, respective frequencies of each of which are varied over the ramp period so that each of the light components has a respective frequency range, the respective frequency ranges differing from one another;
  - receiving light reflected by the object using a receiving unit; and
  - scanning the received light in a particular frequency range at at least two points in time; and
- determining the distance and/or speed of the object based on the emitted light and the points in time at which the received light was scanned.

10. The method as recited in claim 9, wherein the points in time at which scanning is carried out are selected having a same temporal distance.

11. The method as recited in claim 9, wherein the determination of the distance and/or the speed of the object takes place based on a two-dimensional Fourier transform and a frequency estimation.

12. The method as recited in claim 11, wherein the points in time at which the scanning is carried out are selected having a non-equidistant temporal distance and/or frequency spacings between at least two frequency ranges are selected to be different, and the frequency estimation takes place using a compressed sensing method taking into consideration a distance-induced frequency component in a Doppler frequency.

13. A method for determining a distance and/or speed of an object, the method comprising:
- generating light;
- in a single frequency ramp period over time:
  - producing from the light a plurality of light components that each has a respective frequency ramp with which respective frequencies of the respective light component change at a rate over the time of the ramp period from a respective starting frequency of the respective ramp at a start time of the ramp period to a respective ending frequency of the respective ramp at an end time of the ramp period, wherein:
    - the rate is the same for different ones of the plurality of light components so that, for each pair of the plurality of light components, a respective offset between the frequencies of the respective pair is constant throughout the ramp period; and
    - the respective starting frequencies of the plurality of light components all differ from one another so that respective frequency ranges of the plurality of light components all differ from one another; and
  - simultaneously emitting the plurality of light components onto the object in at least one angular range;
- receiving light reflected by the object by scanning the received light in a particular frequency range at least two points in time; and
- determining the distance and/or the speed of the object based on the emitted light and the points in time at which the received light was scanned.

* * * * *